(12) United States Patent
Bridge et al.

(10) Patent No.: US 10,429,499 B2
(45) Date of Patent: Oct. 1, 2019

(54) SENSOR SYSTEM

(71) Applicant: ROLLS-ROYCE plc, London (GB)

(72) Inventors: Francis Bridge, Ashby-de-la-Zouch (GB); Martin A Smith, Derby (GB); Bob E Wilson, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/438,191

(22) Filed: Feb. 21, 2017

(65) Prior Publication Data

US 2017/0261607 A1    Sep. 14, 2017

(30) Foreign Application Priority Data

Mar. 14, 2016  (GB) .................................. 1604287.1

(51) Int. Cl.
| | |
|---|---|
| *G01S 13/08* | (2006.01) |
| *G01H 17/00* | (2006.01) |
| *G01K 5/48* | (2006.01) |
| *G01L 9/00* | (2006.01) |

(52) U.S. Cl.
CPC ............ *G01S 13/08* (2013.01); *G01H 17/00* (2013.01); *G01K 5/48* (2013.01); *G01L 9/0036* (2013.01); *G01L 9/0038* (2013.01); *G01L 9/0039* (2013.01); *G01L 9/0041* (2013.01)

(58) Field of Classification Search
CPC .......... G01S 13/08; G01H 17/00; G01K 5/48; G01L 9/0041
See application file for complete search history.

(56) References Cited

U.S. PATENT DOCUMENTS

| | | | |
|---|---|---|---|
| 3,140,612 | A | 7/1964 | Houghton |
| 4,393,714 | A | 7/1983 | Schmidt |
| 5,065,010 | A | 11/1991 | Knute |

(Continued)

FOREIGN PATENT DOCUMENTS

| | | |
|---|---|---|
| GB | 1055354 A | 1/1967 |
| WO | 97/16698 A1 | 5/1997 |
| WO | 2014/102486 A1 | 7/2014 |

OTHER PUBLICATIONS

Aug. 4, 2017 Extended Search Report issued in European Patent Application No. 17157175.5.

(Continued)

*Primary Examiner* — Akm Zakaria
(74) *Attorney, Agent, or Firm* — Oliff PLC

(57) ABSTRACT

The present invention provides a sensor system for measuring a parameter (e.g. volume, temperature or pressure) of a target, the system comprising a diaphragm, a sensor for measuring the axial spacing between the sensor and the diaphragm, and an axially adjustable mount. The mount has a first axial end for mounting the diaphragm which is axially movable relative to the sensor and an opposing, second axial end which is axially fixed relative to the sensor. The diaphragm and mount define a chamber for receiving the target or for being received within the target. In use, the axial spacing between the first axial end and the second axial end of the mount and thus the axial spacing between the diaphragm and sensor varies as a result of a change in the parameter differential across the diaphragm.

17 Claims, 2 Drawing Sheets

(56) References Cited

U.S. PATENT DOCUMENTS

| | | | | |
|---|---|---|---|---|
| 6,604,427 B1* | 8/2003 | Coleman | ............... | G01L 9/0039 |
| | | | | 73/705 |
| 2006/0070447 A1* | 4/2006 | Agami | .................... | G01L 19/04 |
| | | | | 73/708 |
| 2008/0000307 A1* | 1/2008 | Gysling | .................. | G01F 1/708 |
| | | | | 73/861.44 |
| 2008/0030205 A1* | 2/2008 | Fujii | ........................ | B81B 7/02 |
| | | | | 324/661 |
| 2014/0038004 A1* | 2/2014 | Didra | ...................... | G01L 9/007 |
| | | | | 429/56 |
| 2016/0195445 A1 | 7/2016 | Olivier et al. | | |

OTHER PUBLICATIONS

Aug. 15, 2016 Search Report issued in British Patent Application No. 1604287.1.

* cited by examiner

SENSOR SYSTEM

FIELD OF THE INVENTION

The present invention relates to a sensor system for measuring a parameter such as the pressure, temperature and/or volume of a target. In particular, the present invention relates to a sensor system for measuring the parameter of a target where the target is in a high temperature environment.

BACKGROUND OF THE INVENTION

It is often desirable to measure temperature, pressure or volume changes of a target and numerous sensor technologies are available for making such measurements.

Thermistors are typically used to measure temperature. The resistance of the thermistor changes in response to changes in temperature and can thus be used to determine the corresponding temperature change. Another alternative is to use a thermocouple which produces a temperature-dependent voltage across a connection between two conductive substrates.

To measure pressure, many sensors utilise a diaphragm which is deformed by changes in pressure. The diaphragm deformation may then cause changes in the resistivity of attached strain gauges or in the output voltage of an attached LVDT. Another alternative is for the diaphragm to form part of a capacitor, changes in deformation in the diaphragm causing corresponding changes in capacitance. The changing signals are then used to calculate the corresponding change in pressure.

Ultrasonic and microwave sensors emit ultrasonic waves and microwaves respectively and may detect a return signal which is reflected from a reflective surface of a target. Differences between the emitted and reflected signal can then be used to determine the level of the surface and this can be used to determine the volume of the target.

Eddy current probes are suitable for detecting the level of a conductive surface. Eddy current probes produce a first electromagnetic field which in turn induces an alternating current in the conductive surface. The current produces a second electromagnetic field which interacts with the first electromagnetic field. The resultant electromagnetic field is detected by the probe and may be used to determine the distance between the probe and the electrical conductor.

However, many of these known sensors include complex electronics and/or silicon components which cannot be used in high temperature environments.

SUMMARY OF THE INVENTION

In a first aspect, the present invention provides a sensor system for measuring a parameter of a target, the system comprising:
  a diaphragm;
  a sensor for measuring the axial spacing between the sensor and the diaphragm; and
  an axially adjustable mount having a first axial end for mounting the diaphragm which is axially movable relative to the sensor and an opposing, second axial end which is axially fixed relative to the sensor, the diaphragm and mount defining a chamber for opening into the target or for extending within the target;
  wherein, in use, a change in the parameter differential across the diaphragm results in a change in the volume of the chamber and a change in the axial spacing between the first axial end and the second axial end of the mount and thus a change in the axial spacing between the diaphragm and sensor.

Changes in the axial spacing between the diaphragm and sensor can be used to calculate the change in the target parameter (e.g. temperature, pressure, volume or vibration level). When the target is in a high temperature environment, only the diaphragm and mount need to be within the high temperature environment—the temperature sensitive electronics associated with the sensor can be remotely located in lower temperature environment.

Optional features of the invention will now be set out. These are applicable singly or in any combination with any aspect of the invention.

In some embodiments, the target parameter is temperature, pressure, volume or vibration.

In some embodiments, the sensor comprises an emitter for emitting a signal and a detector for detecting a resultant signal.

The axial spacing (and thus changes in axial spacing) between the sensor and the diaphragm can be determined from the time taken for the detector to receive the resultant signal. An alternative method of calculating the axial spacing (and thus changes in axial spacing) between the sensor and the diaphragm is to compare the emitted and detected signals to determine the phase shift between them. The phase shift can then be used to determine the time of flight which can in turn be used to determine the distance between the sensor and the diaphragm.

In some embodiments, the diaphragm comprises a reflecting surface for reflecting the signal emitted by the emitter back to the sensor for detection by the detector. The diaphragm also comprises an opposing surface for facing the target.

In these embodiments, the sensor may be a microwave, radiofrequency, ultrasonic or optical sensor and the emitter is adapted to generate a microwave, radiofrequency, ultrasonic or optical signal which is then reflected to the detector in the sensor by the reflecting surface of the diaphragm. A microwave sensor (which can emit signals having a wavelength between 1 mm and 1 m) allows the signal frequency to be optimised to the expected spacing range between the sensor and diaphragm.

In some embodiments, the diaphragm comprises an electrical conductor.

In some embodiments, the sensor may be an eddy current sensor with the emitter adapted to generate a signal comprising a first electromagnetic field. The first electromagnetic field induces an alternating current in the diaphragm which results in a second electromagnetic field. The detector detects the interaction signal between the first and second electromagnetic fields and this can be used to determine the spacing between the sensor and the diaphragm.

In some embodiments, the emitter and detector are housed in a single housing, optionally along with core electronics used to calculate the change in target parameter based on the axial movement of the diaphragm relative to the sensor.

In some embodiments, the sensor may be a capacitance sensor which measures the change in capacitance between the sensor and the diaphragm as the axial spacing varies.

In some embodiments, the axially adjustable mount comprises reversibly/resiliently deformable/extendable axial walls. For example, the axially adjustable mount may comprise folded or corrugated walls that can extend and contract in the axial direction to vary the axial spacing between the first and second axial ends of the mount. In these embodiments, the axial walls and diaphragm form a bellows structure which defines the chamber for opening into the target or for being received in/extending within the target.

The diaphragm may be formed of a metal/metal alloy or another material having high temperature capabilities. The axial walls may be formed of the same material as the diaphragm. The diaphragm and axial walls may be integrally formed.

In some embodiments, the axial walls may comprise a biased (e.g. spring-loaded) telescopic sleeve.

In some embodiments, the second axial end of the mount is distal the sensor and the diaphragm is proximal the sensor. In these embodiments, the axial walls of the mount extend from the diaphragm away from the sensor. The axial walls of the mount and the diaphragm define the chamber for opening into the target (i.e. the chamber has an opening proximal the second axial end which is open to the target).

In some embodiments, the second axial end is proximal the sensor and diaphragm is distal the sensor. In these embodiments, the axial walls of the mount extend away from the diaphragm towards the sensor. The axial walls of the mount and the diaphragm define a chamber for being received within/extending into the target e.g. for extending into the gas flow path of a gas turbine.

In these embodiments, the sensor system may further comprise a frame extending from the second axial end of the mount to the sensor to define a passage in which the emitted signal and reflected signal can travel to and from the chamber defined by the diaphragm and mount. This frame may comprise cylindrical or frustoconical walls.

In some embodiments where the second axial end is proximal the sensor and diaphragm is distal the sensor, the sensor may extend within the chamber defined by the axial walls of the mount and the diaphragm.

In some embodiments, the sensor system further comprises a fixing plate which extends from the second axial end of the mount and is spatially fixed relative to the sensor. For example, it may be affixed to the target.

Where there is an increase in pressure in the target, the axial walls of the mount will either axially extend (where the chamber is open to the target) or axially contract (where the chamber is received in/extends into the target). A decrease in pressure results in an opposite change in axial spacing.

Where there is an increase in temperature and a resulting increase in volume, the axial walls of the mount will either axially extend (where the chamber is open to the target) or axially contract (where the chamber is received in/extends into the target). A decrease in temperature results in an opposite change in axial spacing.

Vibration levels can be monitored as the axial walls will extend and contract as a result of the forces resulting from the vibration.

The extension and contract of the walls will vary the axial spacing between the sensor and the diaphragm and this change in axial spacing can be monitored using the sensor.

In a second aspect, the present invention provides a gas turbine engine comprising a sensor system according to the first aspect. For example, the sensor system may be mounted to monitor changes in the temperature, pressure of the gas flow path within a gas turbine engine with the chamber being open to or extending into the gas flow path. In other embodiments, the sensor system could be provided in a fuel or oil reservoir or pipe with the chamber being open to or received within the reservoir/pipe. In yet further embodiments, the sensor system could be mounted onto an engine casing for use in measuring vibration levels of the engine.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
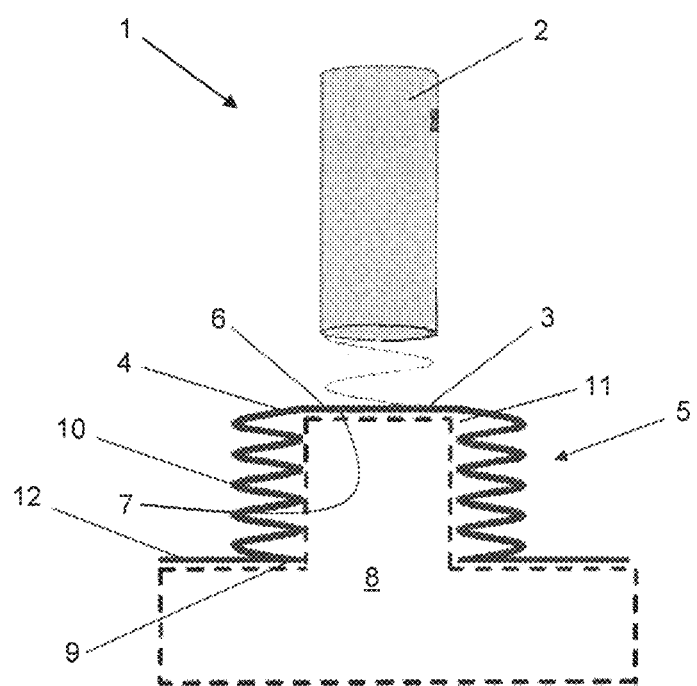
FIG. 1 shows a first embodiment of the present invention.

FIG. 1 shows a sensor system 1 comprising a microwave displacement sensor 2 housing an emitter for emitting a microwave signal and a detector for detecting a reflected microwave signal. The sensor 2 also includes core electronics. A diaphragm 3 is formed of metal and is affixed at the first axial end 4 of an axially adjustable mount 5. The diaphragm has a reflecting surface 6 (which faces the sensor) for reflecting the microwave signal from the emitter back to the detector in the sensor. The diaphragm 3 also has an opposing surface 7 for facing a target to be measured 8.

The mount 5 has an opposing, second axial end 9 which is remote from the sensor 2. The mount 5 has corrugated axial walls 10 which extend from the first axial end 4 away from the sensor 2 to the second axial end 9. The diaphragm 3 and the corrugated axial walls 10 form a bellows structure which can concertina to vary the axial spacing between the first axial end 4/diaphragm 3 and the second axial end 9 of the mount. The bellows structure formed by the diaphragm 3 and mount 5 defines a chamber 11 which is open to the target (a gas flow path in a gas turbine engine) 8.

The sensor system further comprises a fixing plate 12 which extends from the second axial end 9 of the mount 5 and is axially fixed relative to the sensor 2 i.e. the axial spacing between the fixing plate 12 and the sensor 2 is fixed. The fixing plate 12 is affixed to the walls defining the gas flow path 8.

The emitter in the sensor 2 emits a microwave signal which travels towards the reflecting surface 6 of the diaphragm 3 which reflects the signal back to the detector in the sensor 2. The time taken for the signal to travel to and back from the diaphragm 3 is used to calculate (using the core electronics) the distance travelled by the signal and thus the distance between the sensor 2 and the diaphragm 3.

One alternative method of calculating the distance (i.e. the axial spacing) between the sensor 2 and the diaphragm 3 is for the core electronics to compare the emitted and detected waves to determine the phase shift between them. The phase shift can then be used to determine the time of flight which can in turn be used to determine the distance between the sensor 2 and the diaphragm 3.

If a change in the pressure differential across the diaphragm i.e. if the difference between the pressure at the reflecting surface 6 and at the opposing surface 7 changes, the corrugated axial walls 10 of the mount 5 flex and the diaphragm 3 moves axially relative to the sensor 2. For example, if the pressure in the gas flow path 8 increases, the corrugated walls 10 will stretch, the volume within the chamber 11 will increase and the diaphragm 3 will move towards the sensor 2. In this case, the time taken for the emitted signal to travel to the diaphragm 3 from the emitter in the sensor 2 and for the reflected signal to be received by the detector in the sensor 2 will decrease. This decrease will be detected by the core electronics which will use the decrease in time to calculate the change in pressure in the gas flow path 8.

Conversely, if the pressure in the gas flow path 8 decreases, the corrugated walls 10 will contract, the volume within the chamber 11 will decrease and the diaphragm 3 will move away from the sensor 2. In this case, the time taken for the emitted signal to travel to the diaphragm 3 from the emitter in the sensor 2 and for the reflected signal to be received by the detector in the sensor 2 will increase. This increase will be detected by the core electronics which will use the increase in time to calculate the decrease in pressure in the gas flow path 8.

Figure 2:
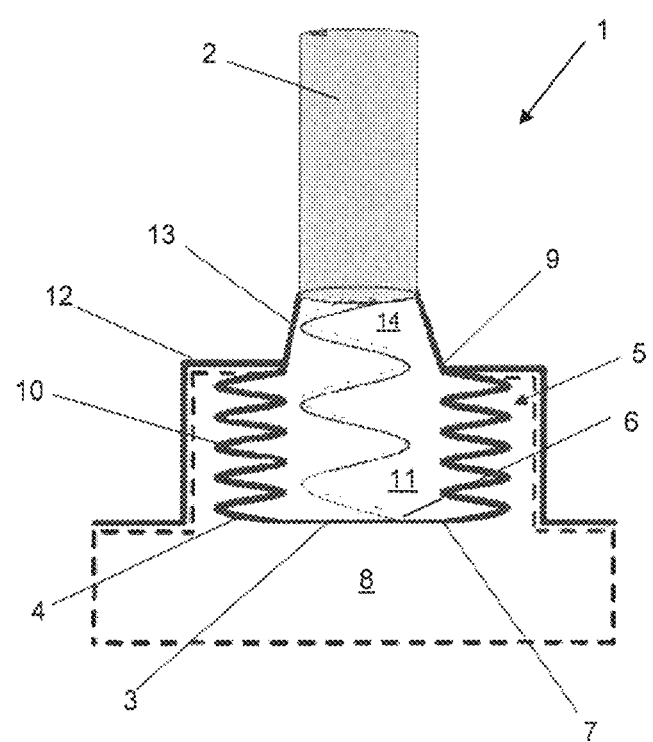
FIG. 2 shows a second embodiment of the present invention.

FIG. 2 shows a second embodiment in which the second axial end 9 of the mount 5 and the fixing plate 12 are proximal the sensor 2 and the first axial end 4/diaphragm 3 are remote from the sensor i.e. the corrugated axial walls 10 of the mount 5 extend from the second axial end 9 away from the sensor 2 towards the first axial end 4/diaphragm 3.

The bellows structure formed by the diaphragm 3 and mount 5 defines a chamber 11 which extends within the gas flow path 8. The sensor system 1 further comprises a frustoconical frame 13 which extends from the second axial end 9 to the sensor 2 to define an enclosed passage 14 in which the emitted and reflected signals can travel to and from the chamber 11.

If a change in the pressure differential across the diaphragm 3 i.e. if the difference between the pressure at the reflecting surface 6 and at the opposing surface 7 changes, the corrugated axial walls 10 of the mount 5 flex and the diaphragm 3 moves axially relative to the sensor 2. For example, if the pressure in the gas flow path 8 increases, the corrugated walls 10 will contract, the volume within the chamber 11 will decrease and the diaphragm 3 will move towards the sensor 2. In this case, the time taken for the emitted signal to travel to the diaphragm 3 from the emitter in the sensor 2 and for the reflected signal to be received by the detector in the sensor 2 will decrease. This decrease will be detected by the core electronics which will use the decrease in time to calculate the change in pressure in the gas flow path 8.

Conversely, if the pressure in the gas flow path 8 decreases, the corrugated walls 10 will expand, the volume within the chamber 11 will increase and the diaphragm 3 will move away from the sensor 2. In this case, the time taken for the emitted signal to travel to the diaphragm 3 from the emitter in the sensor 2 and for the reflected signal to be received by the detector in the sensor 2 will increase. This increase will be detected by the core electronics which will use the increase in time to calculate the decrease in pressure in the gas flow path 8.

Similarly, the relationship between temperature and volume is well known for many commonly used gases and repeated measurement of the axial spacing of the diaphragm relative to the sensor can be used to determine temperature changes. For example, according to the second embodiment, if we assume that the target is an ideal gas at a constant pressure, an increase in volume and a subsequent reduction in axial spacing would both be proportional to an increase in temperature of the gas. Conversely, a reduction in target volume and an increase in axial spacing would correspond to and be proportional to a specific temperature decrease. Axial spacing measurements can therefore be used to determine temperature changes as well.

It will also be appreciated that either of the first or the second embodiments may be used to simply monitor the volume of the target.

In these embodiments, the sensor 2 containing the temperature-sensitive core electronics can be located remotely from the gas flow path 8—only the diaphragm 3 and mount 5 need be in close contact with the gas flow path 8. This allows use of the sensor system 1 for measurement of pressure/temperature/volume changes in a gas flow path 8 located in a high temperature environment e.g. within a gas turbine engine.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A sensor system for measuring a parameter of a target in a gas turbine engine, the sensor system comprising:
    a diaphragm mounted in a second temperature environment of the gas turbine engine;
    a sensor mounted in a first temperature environment of the gas turbine engine, the second temperature environment of the gas turbine engine being hotter than the first temperature environment, the sensor comprising temperature sensitive electronics for measuring an axial spacing between the sensor and the diaphragm, the sensor being connected to a support so that the sensor is spaced from the diaphragm to the extent that the sensor is located in a first temperature environment of the gas turbine engine, whereby there is an unencumbered path between the sensor in the first temperature environment of the gas turbine engine and the second temperature environment of the gas turbine engine; and
    an axially adjustable mount located in the second temperature environment that is hotter than the first temperature environment, the axially adjustable mount having a first axial end for mounting the diaphragm which is axially movable relative to the sensor and an opposing, second axial end which is axially fixed relative to the sensor, the diaphragm and the axially adjustable mount defining a chamber for opening to the target or for extending within the target;
    wherein, in use, a change in a differential of the parameter across the diaphragm results in a change in a volume of the chamber and a change in the axial spacing between the first axial end and the second axial end of the axially adjustable mount and thus a change in the axial spacing between the diaphragm and sensor.

2. The sensor system according to claim 1, wherein the sensor comprises an emitter for emitting a signal and a detector for detecting a resultant signal.

3. The sensor system according to claim 2, wherein the diaphragm comprises a reflecting surface for reflecting the signal emitted by the emitter back to the sensor for detection by the detector.

4. The sensor system according to claim 3, wherein the sensor is a microwave, radiofrequency, ultrasonic or optical sensor and the emitter is adapted to generate a microwave, radiofrequency, ultrasonic or optical signal.

5. The sensor system according to claim 1, wherein the diaphragm comprises an electrical conductor.

6. The sensor system according to claim 5, wherein the sensor is an eddy current sensor with an emitter adapted to generate a signal comprising a first electromagnetic field and a detector adapted to detect an interaction signal between the first electromagnetic field and a second electromagnetic field generated at the diaphragm.

7. The sensor system according to claim 2, wherein the emitter and detector are housed in a single housing with core electronics used to calculate the change in target parameter based on the axial movement of the diaphragm relative to the sensor.

8. The sensor system according to claim 1 wherein the sensor is a capacitance sensor which measures the change in capacitance between the sensor and the diaphragm as the axial spacing varies.

9. The sensor system according to claim 1, wherein the axially adjustable mount comprises resiliently deformable axial walls.

10. The sensor system according to claim 9, wherein the resiliently deformable axial walls comprise folded or corrugated axial walls, the resiliently deformable axial walls and diaphragm forming a bellows structure defining the chamber.

11. The sensor system according to claim 1, wherein the second axial end of the mount is distal the sensor and the diaphragm is proximal the sensor, the axial walls of the mount and the diaphragm defining the chamber for receiving the target.

12. The sensor system according to claim 1, wherein the second axial end of the mount is proximal the sensor and the diaphragm is distal the sensor, the axial walls of the mount and the diaphragm defining the chamber for being received within the target.

13. The sensor system according to claim 12, wherein the sensor system further comprises a frame extending from the second axial end of the mount to the sensor to define an enclosed passage in which the emitted signal and reflected signal can travel to and from the chamber.

14. The sensor system according to claim 1, wherein the sensor system further comprises a fixing plate which extends from the second axial end of the mount and is spatially fixed relative to the sensor.

15. A sensor system for measuring a parameter of a target, the sensor system comprising:
a diaphragm;
a sensor for determining a time that a signal transmitted by the sensor travels from the sensor to the diaphragm and back to the sensor, the sensor using the time for measuring an axial spacing between the sensor and the diaphragm; and
an axially adjustable mount having a first axial end for mounting the diaphragm which is axially movable relative to the sensor and an opposing, second axial end which is axially fixed relative to the sensor, the diaphragm and the axially adjustable mount defining a chamber for opening to the target in a gas turbine engine or for extending within the target;
wherein, in use, a change in a differential of the parameter across the diaphragm results in a change in a volume of the chamber and a change in the axial spacing between the first axial end and the second axial end of the axially adjustable mount and thus a change in the axial spacing between the diaphragm and the sensor.

16. A sensor system for measuring a parameter of a target in a gas turbine engine, the sensor system comprising:
a diaphragm;
a sensor mounted in the gas turbine engine, the sensor being configured for measuring an axial spacing between the sensor and the diaphragm;
an axially adjustable mount having a first axial end for mounting the diaphragm which is axially movable relative to the sensor and an opposing, second axial end which is axially fixed relative to the sensor, the diaphragm and the axially adjustable mount defining a chamber for opening to the target or for extending within the target, the sensor being positioned outside the chamber but being configured to communicate directly from the sensor to within the chamber such that there is an unencumbered path between the sensor and the chamber, the chamber being defined by an area enclosed by interior surfaces of the diaphragm and corrugated axial walls extending from the diaphragm, and the sensor being configured to output a signal to a frame that is connected to the chamber and is outside of the chamber; and
a frame extending from the second axial end of the axially adjustable mount to the sensor to define an enclosed passage in which the emitted signal and reflected signal can travel to and from the diaphragm through the chamber;
wherein, in use, a change in a differential of the parameter across the diaphragm results in a change in a volume of the chamber and a change in the axial spacing between the first axial end and the second axial end of the axially adjustable mount and thus a change in the axial spacing between the diaphragm and sensor.

17. The sensor system according to claim 16, wherein the sensor is a capacitance sensor which measures the change in capacitance between the sensor and the diaphragm as the axial spacing varies.

* * * * *